US006377969B1

(12) United States Patent
Orlando et al.

(10) Patent No.: US 6,377,969 B1
(45) Date of Patent: Apr. 23, 2002

(54) METHOD FOR MULTIPLICATION IN GALOIS FIELDS USING PROGRAMMABLE CIRCUITS

(75) Inventors: Gerardo Orlando, Newton; Christof Paar, Northhampton, both of MA (US)

(73) Assignee: General Dynamics Government Systems Corporation, Taunton, MA (US)

( * ) Notice: Subject to any disclaimer, the term of this patent is extended or adjusted under 35 U.S.C. 154(b) by 0 days.

(21) Appl. No.: 09/298,651

(22) Filed: Apr. 23, 1999

(51) Int. Cl.$^7$ ................................................. G06F 7/00
(52) U.S. Cl. ......................................... 708/492; 380/28
(58) Field of Search ................................ 708/491, 492, 708/620, 625, 627; 380/28, 30

(56) References Cited

U.S. PATENT DOCUMENTS

| 4,567,568 A | 1/1986 | Inagawa et al. |
| 4,745,568 A | 5/1988 | Onyszchuk et al. |
| 5,787,028 A | 7/1998 | Mullin |

OTHER PUBLICATIONS

Koblitz, N., "Elliptic curve cryptosystems," *Mathematics of Computation*, vol. 48, pp. 203–209, 1987.
Miller, V., "Uses of elliptic curves in cryptography," *Advances in Cryptology*, CRYPTO '85, pp. 417–426, Springer–Verlag, 1986.
Koblitz, N., "Hyperelliptic cryptosystems," *Journal of Cryptology*, vol. 1, No. 3, pp. 129–150, 1989.
Paar, C. and Rodriguez, P.S., "Fast Arithmetic Architectures for Public–Key Algorithms Over Galois Fields GF $((2^n)^m)$," *Advances in Cryptography*—EUROCRYPT '97, pp. 363–378, Springer–Verlag, 1997.
Beth, T. and Gollmann, D., "Algorithm engineering for public key algorithms," *IEEE Journal of Selected Areas in Communications*, vol. 7, No. 4, pp. 458–466, 1989.
Bailey, Daniel V. and Paar, Christof, Optimal Extension Fields for Fast Arithmetic in Public–Key Algorithms, CRYPTO 1998, Aug. 23–27, Santa Barbara, pp. 472–485, *Abstract*.
Paar C., Fleischmann P. and Roelse P., Efficient Multiplier Architectures of Galois Fields GF $(2^{4n})$, IEEE Transactions on Computers 47(2):162–170 (1998).
Paar, Christof, "A New Architecture for a Parallel Finite Field Multiplier with Low Complexity Based on Composite Fields", *IEEE Transactions on Computers* 45(7), 1996, pp. 856–861.
Guajardo, J. and Paar C., "Efficient Algorithms for Elliptic Curve Cryptosystems", CRYPTO '97, Aug. 17–21, Santa Barbara.
Paar, C., "Low Complexity Parallel Multipliers for Galois Fields GF $((2^n)^4)$ Based on Special Types of Primitive Polynomials", 1994 IEEE Int. Sypmosium on Information Theory, Trondheim, Norway, Jun. 1994.

(List continued on next page.)

*Primary Examiner*—Chuong Dinh Ngo
(74) *Attorney, Agent, or Firm*—Jenner & Block, LLC

(57) ABSTRACT

A scalable multiplier architecture for the Galois field GF($2^k$) is implemented in a programmable circuit. This architecture may be used in an implementation of public-key cryptosystems which use programmable multipliers in large Galois fields. This architecture is also fine grain scalable in both the time and the area (or logic) dimensions.

50 Claims, 4 Drawing Sheets

OTHER PUBLICATIONS

Hudgins–Bonafield, Christine, "The Encryption Revolution—Cryptologists Urge Use of Longer Keys", *Network Computing Online*. Mar. 1996.

"Strong Crypto Weak", Internet, Feb. 7, 1996.

Blaze, Matt, et al., "Minimal Key Lengths for Symmetric Ciphers to Provide Adequate Commercial Security", Jan. 1996, Business Software Alliance, Chicago, Nov. 20, 1995.

Sutton, Roy, "Field Programmable Gate Arrays", Internet. Apr. 1996.

Barwood, George, Elliptic curve cryptography FAQ v1.12 Dec. 22, 1997, Internet.

Frequently Asked Questions (FAQ) About Programmable Logic, Internet, OptiMagic, Inc. 1997–1998.

Goldberg, Ian and Wagner, David, "Architectural considerations for cryptanalytic hardware" Worldwide Web. May 1996.

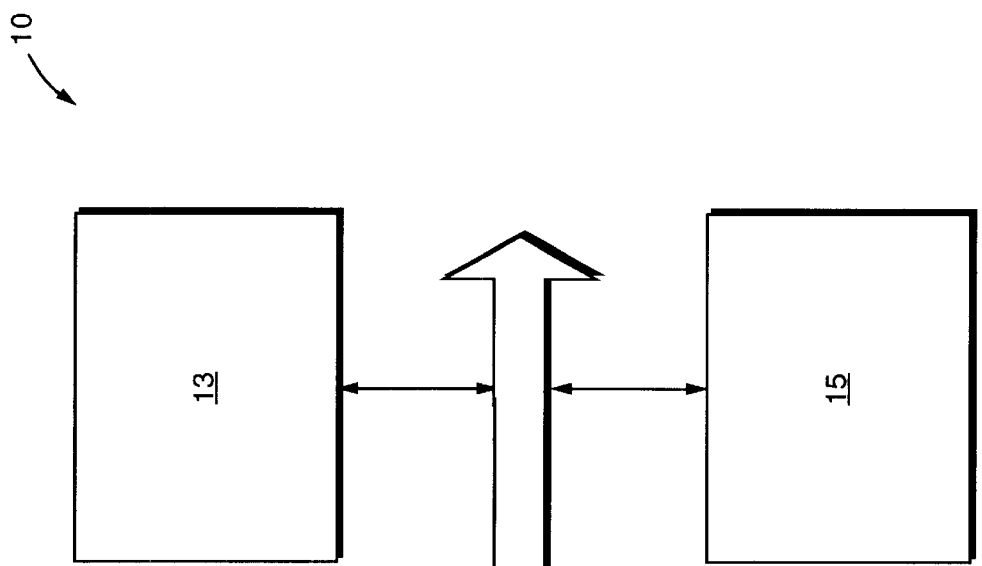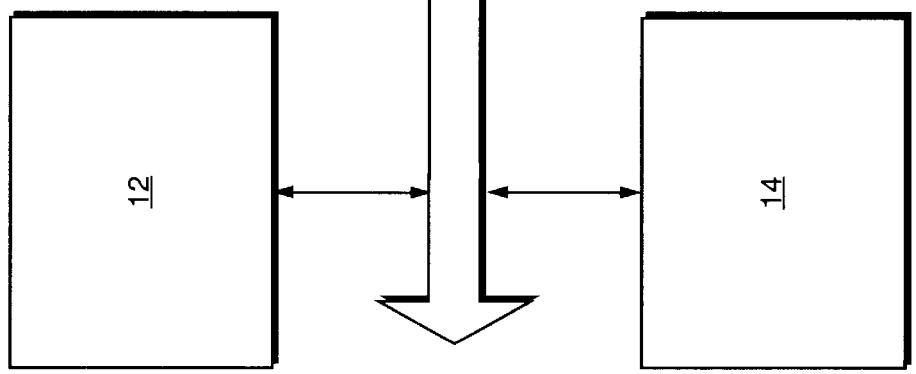
FIG. 1

METHOD FOR MULTIPLICATION IN GALOIS FIELDS USING PROGRAMMABLE CIRCUITS

TECHNICAL FIELD

This invention relates to techniques for performing arithmetic in Galois fields, and more particularly to methods of performing multiplication in a computer system.

BACKGROUND OF THE INVENTION

Applications, including but not limited to popular public-key algorithms, may require arithmetic in Galois fields $GF(2^k)$. Among the applications that may require such multiplication are cryptographic schemes based on the assumed intractability of the discrete logarithm in finite fields, elliptic curve discrete logarithm, or hyperelliptic curves. Galois field multiplication is generally considered the most crucial operation for the performance of these cryptosystems.

Many applications, including public-key cryptographic schemes, may require operations in relatively large finite fields; e.g., about 150–250 bits for elliptic curve systems and 1024 or more bits for systems based on the discrete logarithm problem in finite fields. For physical security as well as for performance reasons, implementations of Galois field arithmetic in hardware are generally very attractive. At the same time, the algorithm-independent design paradigm of modem crypto protocols, and flexible security levels require alterable implementations that may be difficult to provide with traditional (non-reconfigurable) hardware.

BRIEF DESCRIPTION OF DRAWINGS

The above-mentioned and other features of the invention will now become apparent by reference to the following description taken in connection with the accompanying drawings in which:

FIG. 1 is an example of an embodiment of a computer system that includes the invention;

SUMMARY OF THE INVENTION

Figure 2:
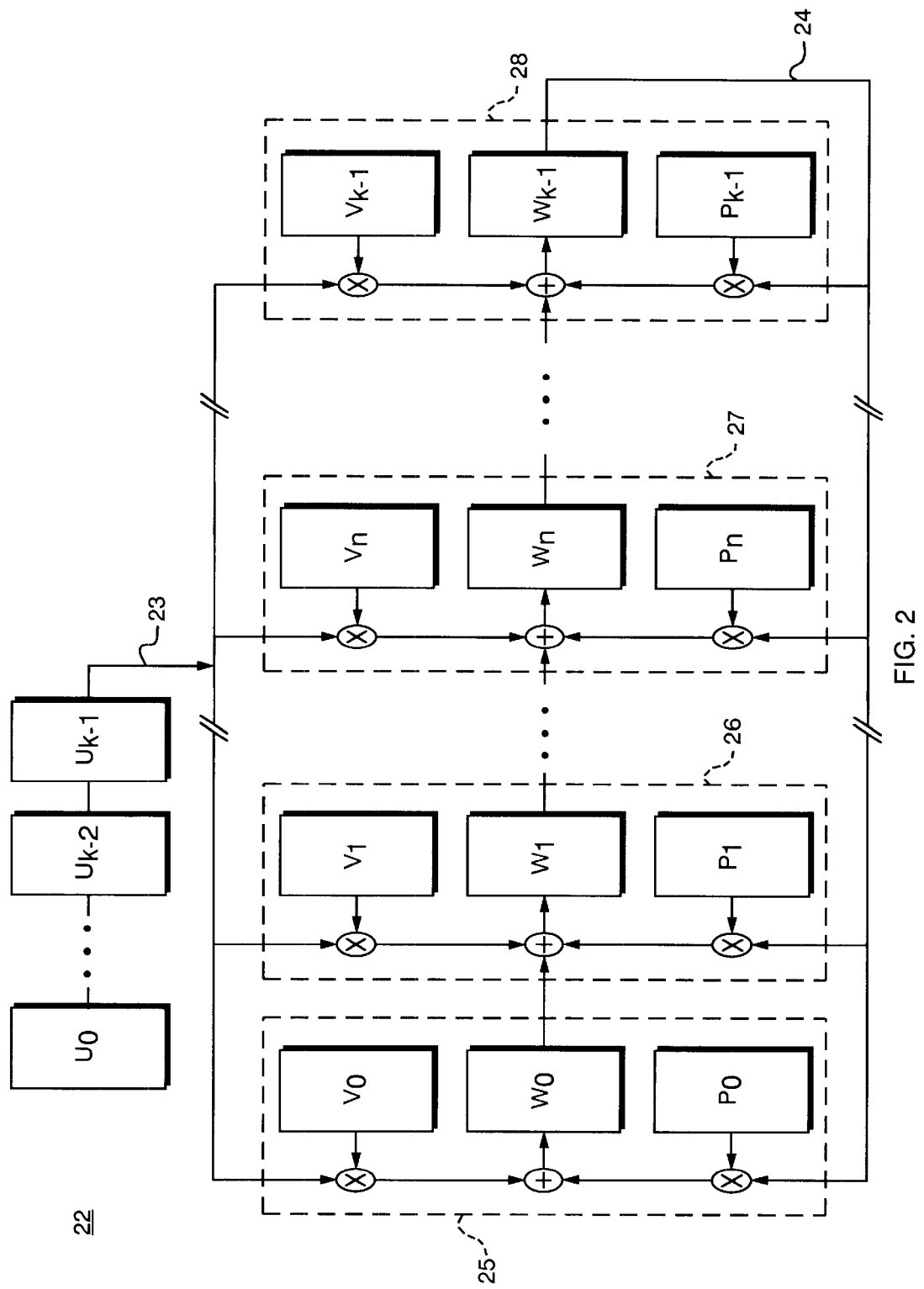
FIG. 2 is an example of an embodiment of a serial multiplier for k-bit multiplication.

In accordance with one aspect of the invention is a method for using a programmable circuit to multiply two binary numbers in a Galois field $GF(2^k)$. An irreducible polynomial of degree k is chosen. A number m less than k is chosen which is no greater than the number of processing elements in the programmable circuit. Functions are logically mapped that would be performed by the $x^{th}$ processor of a k-bit serial multiplier onto the $y^{th}$ processor of an m-bit super-serial multiplier where y=x mod m. The super-serial multiplier is used to emulate in $\lceil k/m \rceil$ cycles one cycle of the serial multiplier, thus multiplying one bit of U by V. The step of using the super-serial multiplier is repeated k times, each time appropriately combining the prior partial product with the results of the current multiplication, whereby the product of U and V is determined in $k*\lceil k/m \rceil$ cycles.

In accordance with another aspect of the invention is a method for programming a programmable circuit to multiply two binary numbers, U and V, of k bits or less, in a Galois field $GF(2^k)$. An irreducible polynomial of degree k is chosen of the form $$P(x) = x^k + \sum_{i=0}^{k-1} p_i x^i, \text{ with } p_i \in GF(2)$$

A number m, less than k, is chosen which is no greater than the number of processing elements in the programmable circuit. The programmable circuit is programmed wherein functions that would be performed by the $x^{th}$ processor of a k-bit serial multiplier are logically mapped onto the $y^{th}$ processor of the m bit super-serial multiplier, where y=x mod m. The programmable circuit is programmed wherein the super-serial multiplier emulates in $\lceil k/m \rceil$ cycles one cycle of the serial multiplier, thus multiplying one bit of U by V. The programmable circuit is programmed wherein the previous step is repeated k times, each time appropriately combining the prior partial product with the results of the current multiplication, whereby the product of U and V is determined in $k*\lceil k/m \rceil$ cycles.

DETAILED DESCRIPTION OF THE PREFERRED EMBODIMENT(S)

Referring now to FIG. 1, shown is an embodiment of a computer system that may include the invention. The computer system 10 of FIG. 1 includes computer processors 12–15 that may communicate using network 16. Other embodiments including the invention may include any number of computer processors of a variety of different types as known to those skilled in the art. They may communicate using a network or other communications medium. An embodiment may also include, for example, a single computer processor, such as a commercially available computer. As will be described in paragraphs that follow, the invention as included in one or more of the computer processors of the computer system 10 may be included in hardware and/or software. For example, an embodiment that will be described below includes a programmable circuit, and in particular a field programmable gate array (FPGA). Other embodiments may include multiple field programmable gate arrays and/or other circuits, or other combinations of hardware and/or software. In paragraphs that follow, described is an embodiment with a field programmable gate array as may be included on a card or computer board included in one of the computer processors 12–15 of the computer system 10. Generally, as described below, this embodiment using a programmable circuit offers fine-grained scalability and inherent reprogrammability and speed.

Previous work in this area generally includes embodiments using traditional serial multipliers, which compute field $GF(2^k)$ multiplication in k cycles using $O(k)$ logic elements, and parallel multipliers that compute field multiplications in 1 cycle using $O(k^2)$ logic elements. Hybrid multipliers for composite fields $GF((2^n)^m)$ have also been introduced. These multipliers perform multiplication in m cycles using $O(mn^2)$ logic elements.

Arithmetic in an extension field of GF(2) is generally considered. The extension degree is denoted by k, so that the field can be denoted by $GF(2^k)$. This field is isomorphic to $GF(2)[x]/(P(x))$, where $$P(x) = x^k + \sum_{i=0}^{k-1} p_i x^i$$

is an irreducible polynomial of degree k with $p_i \in GF(2)$. In the following, a residue class will be identified with the polynomial of least degree in its class. The product of two field elements W=UV, where $$W(x) = \sum_{i=0}^{k-1} w_i x^i, \; U(x) = \sum_{i=0}^{k-1} u_i x^i,$$

and $$V(x) = \sum_{i=0}^{k-1} v_i x^i$$

is defined as follows.

$$W(x) = U(x)V(x) \bmod P(x) \quad (1)$$

$GF(2^k)$ multiplication may be carried out by multiplying U(x) and V(x) and then performing reduction modulo P(x). Alternatively, it may be done by combining multiplication and reduction in an iterative fashion according to Equation (2).

$$U(x)\,V(x) \bmod P(x) = x(\ldots(x((x(u_{k-1}V(x)) \bmod P(x))+(U_{k-2}V(x))) \bmod P(x)) \ldots) \bmod P(x)+u_0V(x) \quad (2)$$

The "inner products" in (2) of the form $[xu_iV(x)]$ result in a product polynomial of degree k which must be reduced modulo P(x). The reduction is done with the identity $$x^k \equiv p_{k-1}x^{k-1}+p_{k-2}x^{k-2}+ \ldots +p_1x+p_0 \bmod P(x) \quad (3)$$

Each multiplication may include a total of $k^2$ bit multiplications and k−1 polynomial reductions.

The serial multiplier may be a parallel polynomial basis multiplier that uses k processors (or slices) and computes $GF(2^k)$ multiplication in k cycles using Algorithm 1:

---

Algorithm 1: Serial multiplier multiplication algorithm

--- w[−1] = 0
w[0 to k − 1] = 0
For i = k − 1 down to 0 Do
    Parallel For j = 0 to k − 1 Do
        w[j] = w[j − 1] + (u[i] * v[j]) + (w[k − 1] * p[j])
    End Parallel For
End For

---

Note:
w[s] represents bit s of the accumulated result computation of $u_rV(x)$, $0 \leq r, s \leq k − 1$ (all operations are in GF(2))

This algorithm is generally an implementation of the multiplication in (2) that may use identity (3) for polynomial reductions. This serial multiplier generally computes $GF(2^k)$ multiplication by recursively computing the partial result $[xu_iV(x) \bmod P(x)+u_{i-1}V(x)]$ (all coefficient operations are mod 2), where the "scalar multiplication" $u_iV(x)$ may be computed in the previous clock cycle. This recursion is generally carried out in k cycles, each consisting of a partial result computed in parallel by the multiplier's k processors. A hardware realization of the multiplier is shown in FIG. 2.

The serial multiplier may be particularly attractive for programmable circuit implementations because it uses very simple processors and a highly distributed interconnect network.

Referring to FIG. 2, shown is an example of an embodiment of a serial multiplier 22. The serial multiplier 22 may include processors 25–28. Each processor may include three registers (v, w, p), two AND gates (GF(2) multipliers), and an XOR gate (GF(2) adder). The interconnect network 23–24 may include connections between neighboring processors, such as 25 and 26, along with two global interconnects (u, $w_{k-1}$). The complexity of this multiplier 22 may be further reduced for implementations that use irreducible polynomials with few coefficients such as trinomials or pentanomials. On average, these implementations may save one register, one AND gate, and one input of the XOR gate per processor.

The main building blocks of many programmable circuits are flip-flops, 4-input function generators that can implement any logical function of its inputs, and memory elements (memory implementations are vendor specific). Using these logic elements as metrics, the logic complexity of this multiplier may be estimated for configurations that implement general P(x) polynomials and those that implement a fixed P(x) polynomial such as a trinomial. The complexity of variations of these configurations that implement the U operand shift register with memory elements may also be estimated. These estimates are generally summarized in Table 1.

In general, the complexity of the serial multiplier may be proportional to k. For fixed polynomial implementations, it also may depend on p, the number of non-zero coefficients of P(x) minus one. For cryptographic and other applications where k is large, p may be approximated to zero for low complexity polynomials such as trinomials and pentanomials for which p=2 and 4 respectively. Because memory implementations are not uniform across programmable circuits, Table 1 summarizes the complexity of implementations of the U operand shift register with memory elements as c, where c may represent the number of resources utilized; that is, c under the Function Generators column may represent the number of function generators utilized, and under the Flip-Flops column may represent the number of flip-flops utilized. These U shift register implementations may require counters that generate memory addresses and miscellaneous multiplexing and decoding logic. For cryptographic applications, the complexity of this circuitry may also be ignored as it may be that c<<k.

The classical serial multiplier described above, an example of which is shown in FIG. 2, generally requires ak resources, where a≧1, for multiplication in $GF(2^k)$. Since the values of k required for practical public-key algorithms are relatively large, at least approximately 150 bit for elliptic curves systems, it is generally attractive to provide multiplier architectures which require less resources. An embodiment that will be described below that includes the invention generally uses ak resources, but this time with a<1. This may be referred to as a "super-serial multiplier" since it generally takes several clock cycles to process one bit of the U operand.

The super-serial multiplier, as will be described in more detail in paragraphs that follow, is also a parallel polynomial basis multiplier that uses m<k processors and computes $GF(2^k)$ multiplication in k*⌈k/m⌉ cycles (see FIG. 4). It implements Algorithm 2 set forth below, which is also a partially parallel implementation of the multiplication (2) that uses identity (3) for polynomial reduction.

Algorithm 2: Serial multiplier's multiplication algorithm w' [−1] = 0
w' [0 to k − 1] = 0
w [0 to k − 1] = 0
For i = k − 1 down to 0 Do
    For j = 0 to ⌈k/m⌉ Do
        Parallel For l = 0 to m − 1 Do
            w [j * m + l] = w' [j * m + l − 1] + (u[i] * v[j * m + l]) +
            w'[k − 1] *p[j * m + l])
        End Parallel For
    End For
    w' [0 to k−1] = w [0 to k−1]
End For Note:
w[s] represents bit s of the accumulated result computation of $u_r V(x)$, $0 \leq r, s \leq k − 1$ (all operations are in GF(2))

As the serial multiplier, it may perform $GF(2^k)$ multiplication by recursively computing the partial result $[xu_i V(x) \bmod P(x) + u_{i-1} V(x)]$ (all coefficient operations are mod 2). This partial result may be computed by its m<k processors in ⌈k/m⌉ cycles, thus realizing multiplication in k*⌈k/m⌉ cycles. In contrast, the serial multiplier may compute this result in one cycle using a larger number of processors and performs multiplication in k cycles. It should be noted that contrary to a serial multiplier, which for a particular field $GF(2^k)$ requires a fixed number of processors ~k and computes a multiplication in a fixed number of cycles (k), the super-serial multiplier generally allows implementations to choose the number of processors (m) that best meet a particular target processing time (k*⌈k/m⌉ cycles per multiplication) in accordance with available resources. This flexible design option is particularly relevant for implementations on reconfigurable hardware.

The super-serial multiplier generally trades area for speed, as it may perform the same algorithm as the serial multiplier, but with a lower degree of parallelism. It should be noted that the reduced parallelism may be accompanied by a reduced number of processing elements and an increased number of storage elements. The implementation in programmable circuits, that use memory elements generally results in a smaller design because it is generally "cheaper" to store data in memory elements than in flip-flops. As an example, the logic complexity of a 16×1-bit memory element in a Xilinx XC4000 field programmable gate array is comparable to that of a single flip-flop.

Figure 3:
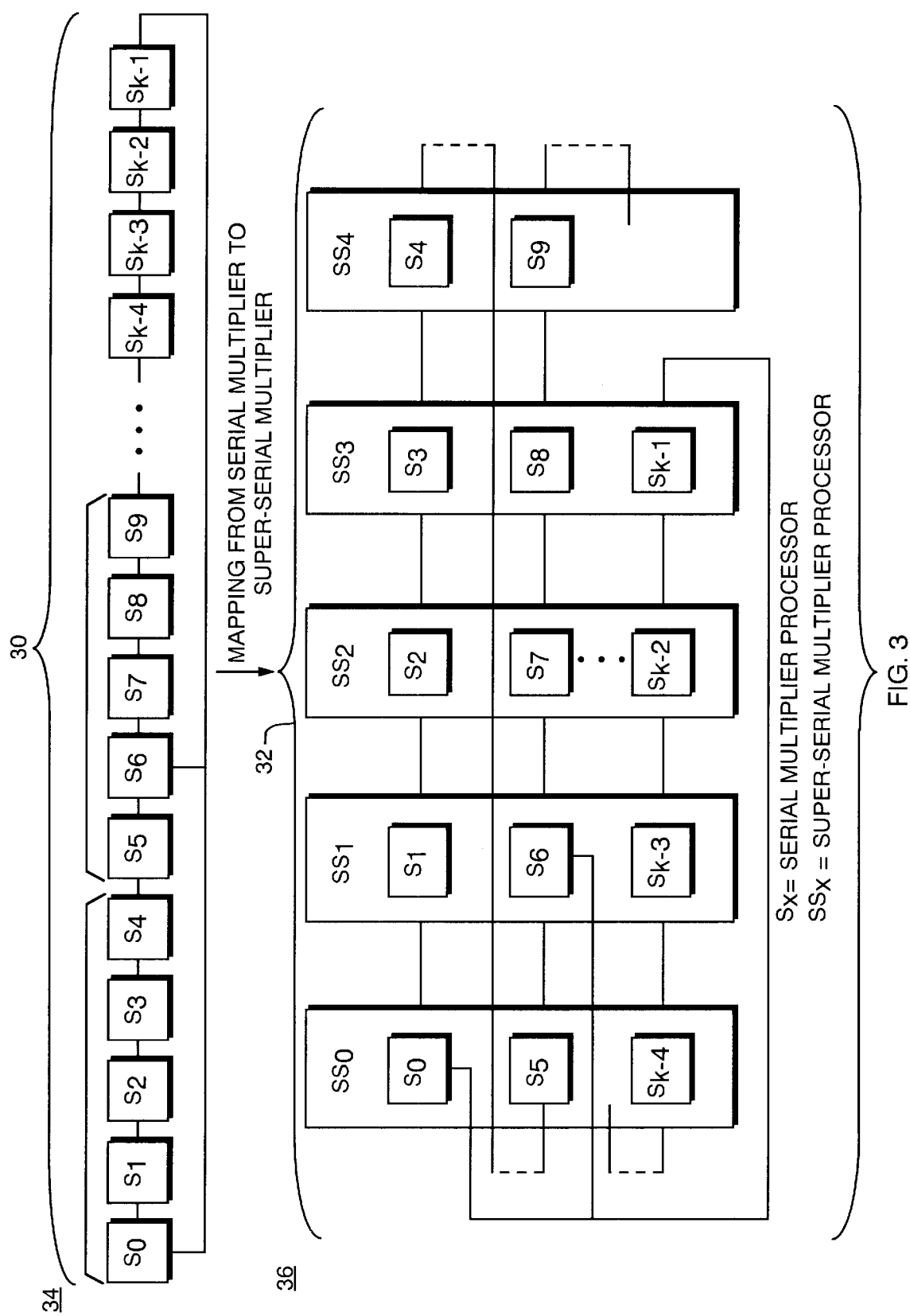
FIG. 3 is an example of an embodiment of a mapping of functions from the k-bit serial multiplier to the m-bit super-serial multiplier which emulates it, for the particular case where m=5.

Referring to FIG. 3, shown is an example of an embodiment of mapping the serial multiplier 34 to the super-serial multiplier 36. Functionally, the super-serial multiplier 36 performs $GF(2^k)$ multiplication by emulating the operation of a serial multiplier 34. The emulation is done by logically mapping the functions performed by the k processors 30 of the serial multiplier 34 into the m processors 32 of the super-serial multiplier 36. This mapping assigns the processing functions of each (x) of the processors of 30 of the serial multiplier 34 to one (y) of the processors of 32 of the super-serial multiplier 36, where the relationship between x and y is given by y≡x mod m. An example of such a mapping for m=5 is illustrated by FIG. 3. It should be noted that only one row with m processing elements is actually realized in hardware. The super-serial multiplier 36 generally emulates the serial multiplier 34 by first emulating processors 0 to m−1, then processors m to 2m−1, and so on until all the k processors of 30 are emulated. This process generally is repeated k times for a full multiplication, which generally results in a complete multiplication after a total of k*⌈k/m⌉ cycles.

Figure 4:
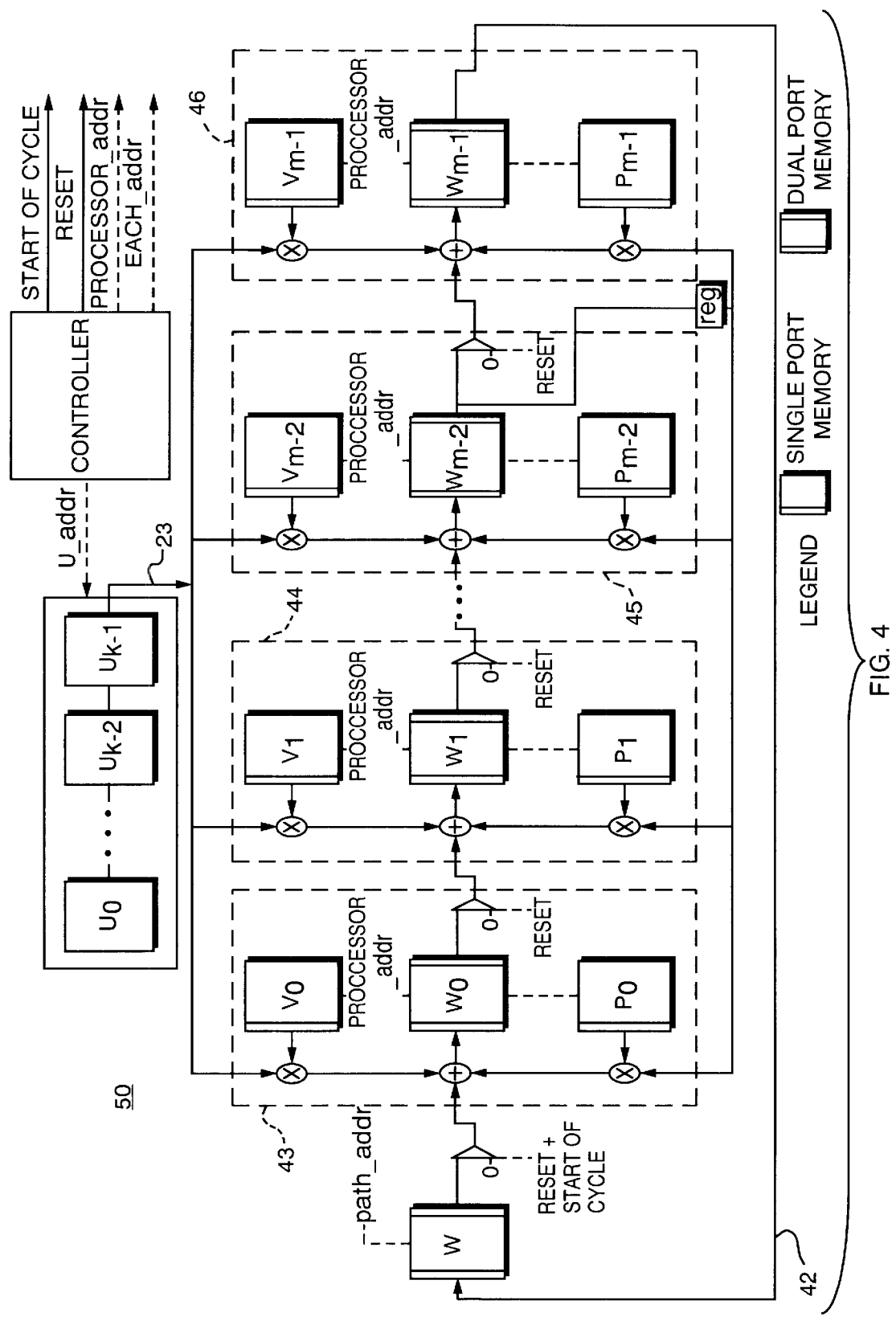
FIG. 4 is an example of an embodiment of a super-serial multiplier.

Referring now to FIG. 4, shown is an example of an embodiment of the super-serial multiplier. To carry out this emulation, the super-serial multiplier 36, 50 incorporates processors 32, 43–46 that generally realize the same mathematical function implemented by the processors 25–28 of the serial multiplier 22. These processors 32, 43–46 also incorporate 3*⌈k/m⌉ bits of storage for the V operand, the multiplication results (W), and the coefficients of the irreducible polynomial (P). This storage may be used to save and restore the state (u, v, p) of the processors they emulate. In addition, the super-serial multiplier 36, 50 incorporates a mechanism 42 for the propagation of results from one cycle to another as the emulation of a serial multiplier cycle generally spans multiple cycles.

When a processor 32, 43–46 from the super-serial multiplier 36, 50 emulates a processor 30, 25–28 from the serial multiplier 34, 22, it generally restores the state of the emulated processor, computes the next partial result, and then saves the new state. For these processors, the first multiplication cycle of the serial multiplication cycle is a special one. This cycle initializes W with the product $u_{k-1} V(x)$ (innermost product of Equation (2)). These processor support this cycle with a special reset emulation circuit that when active forces their output to zero. (This circuit is shown in FIG. 4 with multiplexers.)

The super-serial multiplier 50 incorporates a data transfer mechanism 42 from processor m−1 to processor 0. This mechanism generally is used to emulate the connection between processors m−1 and m, 2m−1 and 2m, . . . , m*⌈k/m⌉−1 and m*⌈k/m⌉ of the serial multiplier. This mechanism incorporates ⌈k/m⌉−1 bits of storage because the results from the emulated processors m−1, 2m−1, . . . m*⌊k/m⌋−1 generally are not immediately used in the following cycle. These results are used in the computation of the next partial result $[xu_i V(x) \bmod P(x) + u_{i-1} V(x)]$ (all coefficient operations are mod 2) not the current one. This detail is easier to grasp by noticing that at the beginning of a multiplication, all the w registers of the serial multiplier 22 of FIG. 2 are reset, and thus all the processors receive a zero from their neighboring processor. The result of this cycle is the initialization of the multiplier with the product $u_{k-1} V(x)$. This partial result is then used in the following multiplication cycle. When the super-serial multiplier 50 of FIG. 4 emulates the first multiplication cycle of the serial multiplier 22, it must store the results corresponding to the emulated serial multiplier processors m−1, 2m−1, . . . , m*⌈k/m⌉−1 as the emulated processors m, 2m, . . . , m*⌊k/m⌋ require a zero from their neighboring processor not the result they just computed. It is important to realize that the storage of these results is generally needed for all the multiplication cycles.

This multiplier 50 also propagates the partial results of the emulated k−1 processor of the serial multiplier 22. This result is latched so it is available through the ⌈k/m⌉ cycles in which it is used by various processors. In the example shown in FIG. 3, this result is propagated to processor 0 where it is used in the first cycle and to processor 1 where it is used in the second cycle.

The serial multiplier requires the loading of the V operand and one bit of the U operand before it can start computing a product. The multiplication result also becomes available all at once on the last clock cycle. For most practical implementations the loading and unloading of data must span multiple clock cycles because the data is typically carried over busses that are much narrower than the field elements. Field elements are commonly more than 150 bits wide in public key applications. Therefore, these multipliers must idle while I/O takes place or must store the results in temporary registers. Implementations of the super-serial multiplier generally can overcome this limitation by using a number of processors equal to the bus width of the interfacing busses. These multipliers may start computing a product as soon as the m least significant bits of the V operand and the most significant bit of the U operand are available. They may also make their results available piecewise, in successive groups of m bits starting with the least significant ones and ending with the most significant ones.

The architecture of the super-serial multiplier 50, shown in FIG. 4, is similar to that of the serial multiplier 22 of FIG. 2 in its processor architecture, processor communications, and storage of the U operand, but it is generally more complex in its control structure. Where the serial multiplier 22 requires minimum control, the super-serial multiplier 50 generally uses a sophisticated controller that guides the emulation of the processors of a serial multiplier and controls the transfer of partial results from one intermediate cycle to another.

The super-serial multiplier 50 may be efficiently implemented in programmable circuits, which implement either centralized or distributed memory because its architecture is memory independent. Its partially distributed and partially centralized interconnect network is also well suited for programmable circuit implementations. Its distributed interconnects are analogous to those of the serial multiplier and its centralized ones are very regular in nature and in practice link a moderate number of processors.

Using the programmable circuit metrics previously noted, we estimated the logic complexity of this multiplier for configurations that implement programmable P(x) polynomials and those that implement a fixed P(x) polynomial such as a trinomial. These estimates are summarized in Table 1. Note that these estimates exclude the complexity of the multiplier's controller as it is tightly coupled to the utilized programmable circuit technology and the system details. As a reference, the complexity of the controller used in the implementation documented in other portions of this application, for example, may include 64 function generators and 26 flip-flops. As for the serial multiplier, these estimates also represent the complexity of the U operand shift register with c.

The multiplier core uses mainly function generators and memory elements. It may use only one flip-flop to store the result from the emulated processor k−1. Its controller generally may consume the bulk of the flip-flops along with some function generators. In general, the complexity in terms of function generators may be proportional to m. For fixed polynomial implementations, it also may depend on p', the number of non-overlapping sets of non-zero coefficients of P(x). These non-overlapping sets generally need to be supported with independent hardware. For example, the multiplier of FIG. 3 requires the propagation of the result from the emulated processor k−1 to the emulated processors 0 and 6, requiring the propagation of this result to two different emulating processors, 0 and 1. For this case, p'=2. If this result is used by a single processor, then p'=1. This would have been the case in FIG. 3 if the propagation of the result were to the emulated processor 5 instead of 6. The multiplier's memory complexity generally depends on both k and m. The term k corresponds to the U operand memory and the terms proportional to m correspond to processors' memory. Unless m is large, accurate estimates should not ignore the complexity of the controller and the U operand shift register.

TABLE 1

Multipliers' approximate estimated logic complexity[1]

| Multiplier | U shift register | P(x) Polynomial | Function Generators | Flip-Flops | Storage Bits |
|---|---|---|---|---|---|
| Serial | flip-flop | programmable | 2 k | 4k | 0 |
|  |  | fixed | k + p | 3k | 0 |
|  | memory | programmable | 2 k + c | 3k + c | k |
|  |  | fixed | k + p + c | 2k + c | k |
| Super-Serial[2] | memory | programmable | 2m + 1 + c | c + 1 | k + (3m + 1)* [k/m] |
|  |  | fixed | m + 1 + p' + c | c + 1 | k + (2m + 1 + p')* [k/m] |

[1]The symbol c refers to U shift register logic; p refers to number of non-zero coefficients of P(x) minus one; p' refers to number of slices requiring $w_{k-1}$ input.
[2]Excludes the complexity of its controller.

An embodiment of the super-serial multiplier 50 may include programmable circuits. An example, by no means exclusive, but only illustrative, is a multiplier for the finite field $GF(2^{167})$, with the field polynomial $P(x)=x^{167}+x^6+1$ over $GF(2)$. This field is interesting as the underlying algebraic structure for public-key cryptosystems based on elliptic curves. Elliptic curves form the most recent family of public-key algorithms with practical relevance, and due to their small field orders (as opposed to RSA or schemes based on the discrete logarithm problem in finite fields), are very attractive for implementation on reconfigurable logic.

This embodiment illustrates compact implementation and thus minimizes the I/O and the control logic, and implements the U operand shift register using memory elements. It also implements a coprocessor interface consisting of an 11-bit bus, a 6-bit address bus, a device select control signal and an interrupt signal that signals the end of a multiplication.

The selection of an 11-bit data bus resulted in an area efficient implementation for $GF(2^{167})$. It led to a high utilization of the memory elements available in the programmable circuits used and minimized the I/O complexity. Since for these programmable circuits the function generators can be configured as 16×1-bit memories, very efficient implementations are achieved when k/m approximates a multiple of 16. For the implementation discussed, this figure is 167/11=15.2 which represents a high utilization of memory elements.

This implementation uses Xilinx XC4000X field programmable gate arrays of speed grade −09. These devices incorporate distributed synchronous single and dual port memories that can be used in place of 4-input function generators. Thus, for these parts the logic complexity of a 16×1-bit memory element is the same as that of a 4-input function generator.

To utilize these multipliers, common interface circuitry is utilized, and the processors are pipelined by adding registers at the outputs of the U operand shift register and at the outputs of the v and the w memory elements. Minor modifications to the controller are also necessary. Pipelining is used because it is possible at practically no logic cost. As Table 1 shows the super-serial multiplier uses far more function generators than flip-flops, which could result in a large number of wasted flip-flops due to the unavailability of routing resources.

For the I/O interface, an 11-bit data bus was used. This bus width was chosen because it matched the number of processors in the implementation of the super-serial multiplier (m=11). This implementation achieved a high utilization of 1×16-bit memory elements for v's, and w's. The overall result is very compact super-serial multiplier for the field $GF(2^{167})$. This parameter selection did not affect the overall area of the serial multiplier.

The implementation's results are summarized in Tables 2 and 3. Table 2 summarizes the logic complexity, compared to that of a serial multiplier. Table 3 summarizes the operational frequency for the implementation compared to that of a serial multiplier and compares the relative programmable circuit resources used.

TABLE 2

Area (or logic) results for the multipliers in $GF(2^{167})$

| Multiplier | Function | Flip-Flops | CLBs[3] |
|---|---|---|---|
| Serial | 420 | 349 | 422 |
| Super-Serial (m = 11) | 152 | 51 | 73 |

[3]Configurable logic blocks consisting of one 3- and two 4-input function generators, and two flip-flops.

TABLE 3

Timings and resource usage of multipliers in $GF(2^{167})$

| Multiplier | FPGA | Percent Func. Gen. | Percent Flip-Flops | Percent CLBs | Operational Freq. (MHZ) |
|---|---|---|---|---|---|
| Super-Serial (m = 11) | XC4005 | 39 | 13 | 37 | 49 |
|  | XC4013 | 13 | 4.4 | 13 | 50 |
|  | XC4028 | 7.4 | 2.5 | 7.1 | 47 |
| Serial | XC4013 | 36 | 30 | 73 | 45 |
|  | XC4028 | 21 | 17 | 41 | 44 |

This architecture is particularly attractive for programmable circuit implementations as it scalable in both time and area, thus allowing implementations to maximize their speed and area by exploring time-area trade-offs.

Substantial area savings are achievable for multipliers suitable for secure elliptic curve cryptosystems. Our illustrative implementation achieves a $GF(2^{167})$ super-serial multiplier that is at least 2.76 times smaller than its serial multiplier counterpart.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. A method for multiplying two binary numbers, U and V, of k bits or less, in a Galois field $GF(2^k)$, using a programmable circuit, comprising:
   a. choosing an irreducible polynomial of degree k, having coefficients of 1 or 0;
   b. choosing a number m, less than k, which is no greater than the number of processing elements in the programmable circuit;
   c. logically mapping functions that would be performed by an $x^{th}$ processor of a k-bit serial multiplier onto a $y^{th}$ processor of an m bit super-serial multiplier, where y=x mod m;
   d. using the super-serial multiplier to emulate in $\lceil k/m \rceil$ cycles one cycle of the serial multiplier, thus multiplying one bit of U by V; and
   e. repeating step d k times, each time appropriately combining the prior partial product with the results of the current multiplication, whereby the product of U and V is determined in $k*\lceil k/m \rceil$ cycles.

2. The method of claim 1, wherein each time step d is performed, processors 0 to m−1 of the serial multiplier are first emulated, then processors m to 2m−1, and so on until all k processors are emulated.

3. The method of claim 1, wherein the super-serial multiplier includes $3*\lceil k/m \rceil$ bits of storage for the V operand, the multiplication result W and the coefficients of the irreducible polynomial P, such storage being used to restore a state of the processor being emulated.

4. The method of claim 1, wherein the super-serial multiplier includes a mechanism to propagate the results from one cycle of the serial multiplier to another.

5. The method of claim 1, wherein the super-serial multiplier first restores a state of the emulated serial processor, then computes the next partial result, then saves a new state.

6. The method of claim 1, wherein in a first multiplication cycle of the serial multiplication emulation W is initialized with the product $u_{k-1}V(x)$.

7. The method of claim 1, wherein the super-serial multiplier includes a data transfer mechanism from processor m−1 to processor 0, to emulate the connection between processors m−1 and m, 2m−1 and 2m, and so forth, in the serial multiplier.

8. The method of claim 1, wherein the irreducible polynomial P(x) is a trinomial of the form $x^k+x^r+1$.

9. The method of claim 8, wherein the irreducible polynomial P(x) is a trinomial of the form $x^k+x^r+1$, where r is small compared to k.

10. The method of claim 1, wherein the programmable circuit is a programmable integrated circuit.

11. The method of claim 10, wherein the programmable integrated circuit is a field programmable gate array.

12. A method for programming a programmable circuit to multiply two binary numbers, U and V, of k bits or less, in a Galois field $GF(2^k)$, comprising:
   a. choosing an irreducible polynomial of degree k, having coefficients of 1 or 0;
   b. choosing a number m, less than k, which is no greater than the number of processing elements in the programmable circuit;
   c. programming the programmable circuit wherein functions that would be performed by an $x^{th}$ processor of a k-bit serial multiplier are logically mapped onto a $y^{th}$ processor of the m bit super-serial multiplier, where y=x mod m;
   d. programming the programmable circuit wherein the super-serial multiplier emulates in $\lceil k/m \rceil$ cycles one cycle of the serial multiplier, thus multiplying one bit of U by V; and
   e. programming the programmable circuit wherein the process of step d is repeated k times, each time appropriately combining prior partial product with results of the current multiplication, whereby the product of U and V is determined in $k*\lceil k/m \rceil$ cycles.

13. The method of claim 12, further including programming the programmable circuit wherein each time step d is performed processors 0 to m−1 of the serial multiplier are first emulated, then processors m to 2m−1, and so on until all k processors are emulated.

14. The method of claim 12, further including programming the programmable circuit wherein the super-serial multiplier includes $3*\lceil k/m \rceil$ bits of storage for the V operand, the multiplication result W and the coefficients of the irreducible polynomial P, such storage being used to restore a state of the processor being emulated.

15. The method of claim 12, further including programming the programmable circuit wherein the super-serial multiplier includes a mechanism to propagate results from one cycle of the serial multiplier to another.

16. The method of claim 12, further including programming the programmable circuit wherein the super-serial multiplier first restores the state of the emulated serial processor, then computes a next partial result, then saves a new state.

17. The method of claim 12, further including programming the programmable circuit wherein in a first multiplication cycle of the serial multiplication emulation W is initialized with a product $u_{k-1}V(x)$.

18. The method of claim 12, further including programming the programmable circuit wherein the super-serial multiplier includes a data transfer mechanism from processor m−1 to processor 0, to emulate the connection between processors m−1 and m, 2m−1 and 2m, and so forth, in the serial multiplier.

19. The method of claim 12, further including programming the programmable circuit wherein the irreducible polynomial P(x) is a trinomial of the form $x^k+x^r+1$.

20. The method of claim 19, further including programming the programmable circuit where the irreducible polynomial P(x) is a trinomial of the form $x^k+x^r+1$, where r is small compared to k.

21. The method of claim 12, wherein the programmable circuit is a programmable integrated circuit.

22. The method of claim 21, wherein the programmable integrated circuit is a field programmable gate array.

23. A method for emulating the operation of a serial multiplier multiplying two binary numbers U and V, of k bits or less, in the Galois field $GF(2^k)$ in a programmable circuit, comprising:
   a. choosing an irreducible polynomial of degree k, having coefficients of 1 or 0;
   b. choosing a number m, less than k, which is no greater than the number of processing elements in the programmable circuit;
   c. logically mapping functions that would be performed by an $x^{th}$ processor of the k-bit serial multiplier onto an $y^{th}$ processor of the m-bit super-serial multiplier, where y=x mod m; and
   d. using the super-serial multiplier to emulate in $\lceil k/m \rceil$ cycles one cycle of the serial multiplier, thereby multiplying one bit of U by V.

24. The method of claim 23, wherein the process of step d is repeated k times, each time appropriately combining the prior partial product with the results of a current multiplication, whereby the product of U and V is determined in $k*\lceil k/m \rceil$ cycles.

25. The method of claim 24, wherein each time step d is performed processors 0 to m−1 of the serial multiplier are first emulated, then processors m to 2m−1, and so on until all k processors are emulated.

26. The method of claim 25, wherein the super-serial multiplier includes $3*\lceil k/m \rceil$ bits of storage for the V operand, the multiplication result W and the coefficients of the irreducible polynomial P, such storage being used to restore a state of the processor being emulated.

27. The method of claim 26, wherein the super-serial multiplier includes a mechanism to propagate the results from one cycle of the serial multiplier to another.

28. The method of claim 27, wherein the super-serial multiplier first restores the state of the emulated serial processor, then computes a next partial result, then saves a new state.

29. The method of claim 28, wherein in a first multiplication cycle of the serial multiplication emulation W is initialized with a product $u_{k-1}V(x)$.

30. The method of claim 29, wherein the super-serial multiplier includes a data transfer mechanism from processor m−1 to processor 0, to emulate the connection between processors m−1 and m, 2m−1 and 2m, and so forth, in the serial multiplier.

31. The method of claim 30, wherein the irreducible polynomial P(x) is a trinomial of the form $x^k+x^r+1$.

32. The method of claim 31, wherein the irreducible polynomial P(x) is a trinomial of the form $x^k+x^r+1$, where r is small compared to k.

33. The method of claim 32, wherein the programmable circuit is a programmable integrated circuit.

34. The method of claim 33, wherein the programmable integrated circuit is a field programmable gate array.

35. A programmable circuit program to multiply two binary numbers, U and V, of k bits or less, in a Galois field $GF(2^k)$, comprising:
   a. means for choosing an irreducible polynomial of degree k, having coefficients of 1 or 0;
   b. means for choosing a number m, less than k, which is no greater than the number of processing elements in the programmable circuit;
   c. means for logically mapping of functions that would be performed by an $x^{th}$ processor of a k-bit serial multiplier onto a $y^{th}$ processor of the m bit super-serial multiplier, where y=x mod m;
   d. means for having a super-serial multiplier emulate in $\lceil k/m \rceil$ cycles one cycle of a serial multiplier, thereby multiplying one bit of U by V; and
   e. means for repeating step d k times, each time appropriately combining a prior partial product with results of a current multiplication, whereby the product of U and V is determined in $k*\lceil k/m \rceil$ cycles.

36. The programmable circuit program of claim 35, wherein each time step d is performed, processors 0 to m−1 of the serial multiplier are first emulated, then processors m to 2m−1, and so on until all k processors are emulated.

37. The programmable circuit program of claim 36, wherein the super-serial multiplier coefficients of the irreducible polynomial P, such storage being used to restore a state of the processor being emulated.

38. The programmable circuit program of claim 37, wherein the super-serial multiplier includes a mechanism to propagate results from one cycle of the serial multiplier to another.

39. The programmable circuit program of claim 38, wherein the programmable circuit program includes a means to first restore the state of the emulated serial processor, then compute a next partial result, and save a new state.

40. The programmable circuit program of claim 39, wherein the programmable circuit program includes a means in a first multiplication cycle of the serial multiplication emulation to initialize W with a product $u_{k-1}V(x)$.

41. The programmable circuit program of claim 40, wherein the programmable circuit program includes a data transfer mechanism from processor m−1 to processor 0 in the super-serial multiplier, to emulate the connection between processors m−1 and m, 2m−1 and 2m, and so forth, in the serial multiplier.

42. The programmable circuit program of claim 41, wherein the irreducible polynomial P(x) is a trinomial of the form $x^k+x^r+1$.

43. The programmable circuit program of claim 42, wherein the irreducible polynomial P(x) is a trinomial of the form $x^k+x^r+1$, where r is small compared to k.

44. The programmable circuit program of claim 43, wherein the programmable circuit program is a programmable integrated circuit program.

45. The programmable integrated circuit program of claim 44, wherein the programmable integrated circuit program is a field programmable gate array program.

46. A method for programming a programmable circuit to multiply two binary numbers, U and V, of k bits or less, in a Galois field $GF(2^k)$, comprising:

a. choosing an irreducible polynomial of degree k, having coefficients of 1 or 0;

b. choosing a number m, less than k, which is no greater than the number of processing elements in the programmable circuit;

c. programming the programmable circuit wherein functions that would be performed by the $x^{th}$ processor of a k-bit serial multiplier are logically mapped onto the $y^{th}$ processor of the m bit super-serial multiplier, where y=x mod m;

d. programming the programmable circuit wherein the super-serial multiplier emulates in $\lceil k/m \rceil$ cycles one cycle of the serial multiplier, thus multiplying one bit of U by V; and e. programming the programmable circuit wherein the process of step d is repeated k times, each time appropriately combining the prior partial product with the results of the current multiplication, whereby the product of U and V is determined in $k*\lceil k/m \rceil$ cycles;

f. programming the programmable circuit wherein each time step d is performed, processors 0 to m−1 of the serial multiplier are first emulated, then processors m to 2m−1 are emulated, and so on until all k processors are emulated, g. programming the programmable circuit wherein the super-serial multiplier includes $3*\lceil k/m \rceil$ bits of storage for the V operand, the multiplication result W and the coefficients of the irreducible polynomial P, such storage being used to restore the state of the processor being emulated, h. programming the programmable circuit wherein the super-serial multiplier including a mechanism to propagate results from one cycle of the serial multiplier to another, i. programming the programmable circuit wherein the super-serial multiplier first restores the state of the emulated serial processor, then computes a next partial result, then saves a new state, j. programming the programmable circuit wherein in a first multiplication cycle of the serial multiplication emulation W is initialized with a product $u_{k-1}V(x)$, k. programming the programmable circuit wherein the super-serial multiplier includes a data transfer mechanism from processor m−1 to processor 0, to emulate the connection between processors m−1 and m, 2m−1 and 2m, and so forth, in the serial multiplier, and l. programming the programmable circuit wherein the irreducible polynomial P(x) is a trinomial of the form $x^k+x^r+1$, where r is small compared to k.

47. A programmable circuit to multiply two binary numbers, U and V, of k bits or less, in a Galois field $GF(2^k)$, comprising:

a. means for logically mapping functions that would be performed by an $x^{th}$ processor of a k-bit serial multiplier onto a $y^{th}$ processor of an m bit super-serial multiplier, where y=x mod m, m being less than k, and being no greater than the number of processing elements in the programmable circuit;

b. means for choosing an irreducible polynomial of degree k, having coefficients of 1 or 0, c. means for using the super-serial multiplier to emulate in $\lceil k/m \rceil$ cycles one cycle of the serial multiplier, thus multiplying one bit of U by V; and d. means for repeating step d k times, each time appropriately combining the prior partial product with the results of the current multiplication, whereby the product of U and V is determined in $k*\lceil k/m \rceil$ cycles.

48. The programmable circuit of claim 47, wherein the super-serial multiplier includes $3*\lceil k/m \rceil$ bits of storage for the V operand, the multiplication result W and the coefficients of the irreducible polynomial P, such storage being used to restore a state of the processor being emulated.

49. The programmable circuit of claim 48, wherein the programmable circuit is a programmable integrated circuit.

50. The programmable integrated circuit of claim 49, wherein the programmable integrated circuit is a field programmable gate array.

\* \* \* \* \*

UNITED STATES PATENT AND TRADEMARK OFFICE
CERTIFICATE OF CORRECTION

PATENT NO.    : 6,377,969 B1  
DATED         : April 23, 2002  
INVENTOR(S)   : Gerardo Orlando and Christof Paar It is certified that error appears in the above-identified patent and that said Letters Patent is hereby corrected as shown below:

<u>Column 3,</u>  
Line 29, delete "P(x)) + ($U_{k-2}$ V(x)))  and insert -- P(x)) + ($u_{k-2}$ V(x))) --

<u>Column 11,</u>  
Line 58, delete "Wand" and insert -- W and --

<u>Column 12,</u>  
Line 40, delete "The programmable circuit program of claim 36, wherein the super-serial multiplier coefficients of the irreducible polynomial P, such storage being used to restore a state of the processor being emulated." and insert -- The programmable circuit program of claim 36, wherein the super-serial multiplier includes 3 * $\lceil k/m \rceil$ bits of storage for the *V* operand, the multiplication result *W* and the coefficients of the irreducible polynomial *P*, such storage being used to restore a state of the processor being emulated. --

Signed and Sealed this

First Day of October, 2002

*Attest:*

*Attesting Officer*

JAMES E. ROGAN  
*Director of the United States Patent and Trademark Office*